(12) United States Patent
Yang et al.

(10) Patent No.: US 11,910,430 B2
(45) Date of Patent: Feb. 20, 2024

(54) COLLISION RESOLUTION FOR CHANNEL STATE INFORMATION REPORTING ON A PHYSICAL UPLINK CONTROL CHANNEL

(71) Applicant: QUALCOMM Incorporated, San Diego, CA (US)

(72) Inventors: Wei Yang, San Diego, CA (US); Peter Gaal, San Diego, CA (US); Seyedkianoush Hosseini, San Diego, CA (US); Seyed Ali Akbar Fakoorian, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/948,896

(22) Filed: Oct. 5, 2020

(65) Prior Publication Data

US 2021/0105796 A1 Apr. 8, 2021

Related U.S. Application Data

(60) Provisional application No. 62/911,675, filed on Oct. 7, 2019.

(51) Int. Cl.
*H04W 72/566* (2023.01)
*H04W 72/0446* (2023.01)
(Continued)

(52) U.S. Cl.
CPC ........ *H04W 72/569* (2023.01); *H04B 7/0626* (2013.01); *H04W 72/0446* (2013.01); *H04W 72/21* (2023.01); *H04W 74/085* (2013.01)

(58) Field of Classification Search
CPC ......... H04W 72/1284; H04W 72/1242; H04W 72/569; H04W 72/0446; H04W 72/21;
(Continued)

(56) References Cited

U.S. PATENT DOCUMENTS

2012/0039252 A1* 2/2012 Damnjanovic ..... H04W 72/085
370/328
2016/0014753 A1* 1/2016 Wu ....................... H04L 1/1812
370/280
(Continued)

OTHER PUBLICATIONS

Predictive Network Control in Multi-Connectivity Mobility for URLLC Services, Guzman et al., IEEE Xplore (Year: 2019).*
(Continued)

*Primary Examiner* — Yu-Wen Chang
(74) *Attorney, Agent, or Firm* — Sevan Savsa; Harrity & Harrity, LLP

(57) ABSTRACT

Various aspects of the present disclosure generally relate to wireless communication. In some aspects, a user equipment (UE) may identify multiple channel state information (CSI) reports scheduled to be transmitted in a slot on respective physical uplink control channel (PUCCH) resources. For example, the multiple CSI reports may include one or more CSI reports associated with a first service type and one or more CSI reports associated with a second service type. The UE may select, from the multiple CSI reports, one or more CSI reports to be transmitted in the slot based at least in part on a first priority associated with the first service type and a second priority associated with the second service type. Accordingly, the UE may transmit, in the slot, one or more PUCCH transmissions that include the one or more selected CSI reports. Numerous other aspects are provided.

24 Claims, 11 Drawing Sheets

(51) Int. Cl.
  *H04B 7/06* (2006.01)
  *H04W 72/21* (2023.01)

(58) Field of Classification Search
  CPC ... H04W 74/085; H04W 24/10; H04W 72/56; H04L 1/0026; H04L 1/0027; H04L 1/1854; H04L 5/0064; H04L 5/0057; H04L 5/0007; H04B 7/0626; H04B 7/0617
  See application file for complete search history.

(56) References Cited

U.S. PATENT DOCUMENTS

| | | | | |
|---|---|---|---|---|
| 2016/0226649 | A1* | 8/2016 | Papasakellariou | H04W 4/70 |
| 2017/0367087 | A1* | 12/2017 | Seo | H04W 72/048 |
| 2018/0302895 | A1* | 10/2018 | Akkarakaran | H04J 3/1694 |
| 2018/0324797 | A1* | 11/2018 | Hosseini | H04W 72/23 |
| 2019/0215870 | A1* | 7/2019 | Babaei | H04W 24/10 |
| 2019/0261361 | A1 | 8/2019 | Xiong et al. | |
| 2019/0313348 | A1* | 10/2019 | MolavianJazi | H04W 52/365 |
| 2020/0022161 | A1* | 1/2020 | Yang | H04W 72/0413 |
| 2020/0329437 | A1* | 10/2020 | MolavianJazi | H04W 52/146 |
| 2020/0404692 | A1* | 12/2020 | Yin | H04L 1/0031 |
| 2021/0218451 | A1* | 7/2021 | Li | H04W 72/10 |
| 2021/0377991 | A1* | 12/2021 | Takeda | H04L 1/001 |
| 2022/0078768 | A1* | 3/2022 | El Hamss | H04L 5/0055 |
| 2022/0286176 | A1* | 9/2022 | Grossmann | H04L 5/0023 |
| 2022/0353698 | A1* | 11/2022 | Jang | H04L 1/189 |

OTHER PUBLICATIONS

International Search Report and Written Opinion—PCT/US2020/070620—ISA/EPO—dated Dec. 9, 2020.
Motorola Mobility et al., "UCI Enhancement and Intra-UE Prioritization for URLLC" 3GPP Draft, 3GPP TSG RAN WG1 Meeting #98, R1-1909153 UCI Enhancement for URLLC, 3rd Generation Partnership Project (3GPP), Mobile Competence Centre, 650, Route Des Lucioles, F-06921 Sophia-Antipolis Cedex, France, vol. RAN WG1. No. Prague. CZ, Aug. 26, 2019-Aug. 30, 2019 Aug. 17, 2019 (Aug. 17, 2019), XP051765758, pp. 1-6, Retrieved from the Internet: URL: http://www.3gpp.org/ftp/tsg ran/WG1 RL1/TSGR1 98/Docs/ R1-1909153.zip [retrieved on Aug. 17, 2019] Section 3.
Nokia., et al., "Remaining Details for CSI Reporting on PUCCH", 3GPP Draft, 3GPP TSG RAN WG1 Meeting AH 1801, R1-1800744 CSI Reporting on PUCCH, 3rd Generation Partnership Project (3GPP), Mobile Competence Centre, 650, Route Des Lucioles, F-06921 Sophia-Antipolis Cedex, France, vol. RAN WG1. No. Vancouver. Canada, Jan. 22, 2018-Jan. 26, 2018 Jan. 12, 2018 (Jan. 12, 2018), XP051384482, 5 Pages, Retrieved from the Internet:URL:http://www.3gpp.org/ftp/tsg%5Fran/WG1%5FRL1/TSGR1%5FAH/NR%5FAH%5F1801/Docs/ [retrieved on Jan. 12, 2018].

* cited by examiner

COLLISION RESOLUTION FOR CHANNEL STATE INFORMATION REPORTING ON A PHYSICAL UPLINK CONTROL CHANNEL

CROSS-REFERENCE TO RELATED APPLICATION

This Patent Application claims priority to U.S. Provisional Patent Application No. 62/911,675, filed on Oct. 7, 2019, entitled "COLLISION RESOLUTION FOR CHANNEL STATE INFORMATION REPORTING ON A PHYSICAL UPLINK CONTROL CHANNEL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for collision resolution for channel state information (CSI) reporting on a physical uplink control channel (PUCCH).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: identifying multiple channel state information (CSI) reports scheduled to be transmitted in a slot on respective physical uplink control channel (PUCCH) resources, wherein the multiple CSI reports include one or more CSI reports associated with a first service type and one or more CSI reports associated with a second service type; selecting, from the multiple CSI reports, one or more CSI reports to be transmitted in the slot based at least in part on a first priority associated with the first service type and a second priority associated with the second service type; and transmitting, in the slot, one or more PUCCH transmissions that include the one or more selected CSI reports.

In some aspects, a UE for wireless communication may include a memory and one or more processors operatively coupled to the memory. The memory and the one or more processors may be configured to: identify multiple CSI reports scheduled to be transmitted in a slot on respective PUCCH resources, wherein the multiple CSI reports include one or more CSI reports associated with a first service type and one or more CSI reports associated with a second service type; select, from the multiple CSI reports, one or more CSI reports to be transmitted in the slot based at least in part on a first priority associated with the first service type and a second priority associated with the second service type; and transmit, in the slot, one or more PUCCH transmissions that include the one or more selected CSI reports.

In some aspects, a non-transitory computer-readable medium may store one or more instructions for wireless communication. The one or more instructions, when executed by one or more processors of a UE, may cause the one or more processors to: identify multiple CSI reports scheduled to be transmitted in a slot on respective PUCCH resources, wherein the multiple CSI reports include one or more CSI reports associated with a first service type and one or more CSI reports associated with a second service type; select, from the multiple CSI reports, one or more CSI reports to be transmitted in the slot based at least in part on a first priority associated with the first service type and a second priority associated with the second service type; and transmit, in the slot, one or more PUCCH transmissions that include the one or more selected CSI reports.

In some aspects, an apparatus for wireless communication may include means for identifying multiple CSI reports scheduled to be transmitted in a slot on respective PUCCH resources, wherein the multiple CSI reports include one or more CSI reports associated with a first service type and one or more CSI reports associated with a second service type; means for selecting, from the multiple CSI reports, one or more CSI reports to be transmitted in the slot based at least in part on a first priority associated with the first service type and a second priority associated with the second service type; and means for transmitting, in the slot, one or more PUCCH transmissions that include the one or more selected CSI reports.

Aspects generally include a method, apparatus, system, computer program product, non-transitory computer-readable medium, user equipment, base station, wireless communication device, and/or processing system as substantially described herein with reference to and as illustrated by the accompanying drawings and specification.

In some aspects, a method of wireless communication, performed by a base station, may include: identifying multiple CSI reports that a UE is scheduled to transmit in a slot on respective PUCCH resources, wherein the multiple CSI reports include one or more CSI reports associated with a first service type and one or more CSI reports associated with a second service type; determining, from the multiple CSI reports, one or more CSI reports to be transmitted in the slot based at least in part on a first priority associated with the first service type and a second priority associated with the second service type; and receiving, in the slot, one or more PUCCH transmissions that include the one or more CSI reports.

In some aspects, a UE for wireless communication may include a memory and one or more processors operatively coupled to the memory. The memory and the one or more processors may be configured to: identify multiple CSI reports that a UE is scheduled to transmit in a slot on respective PUCCH resources, wherein the multiple CSI reports include one or more CSI reports associated with a first service type and one or more CSI reports associated with a second service type; determine, from the multiple CSI reports, one or more CSI reports to be transmitted in the slot based at least in part on a first priority associated with the first service type and a second priority associated with the second service type; and receive, in the slot, one or more PUCCH transmissions that include the one or more CSI reports.

In some aspects, a non-transitory computer-readable medium may store one or more instructions for wireless communication. The one or more instructions, when executed by one or more processors of a UE, may cause the one or more processors to: identify multiple CSI reports that a UE is scheduled to transmit in a slot on respective PUCCH resources, wherein the multiple CSI reports include one or more CSI reports associated with a first service type and one or more CSI reports associated with a second service type; determine, from the multiple CSI reports, one or more CSI reports to be transmitted in the slot based at least in part on a first priority associated with the first service type and a second priority associated with the second service type; and receive, in the slot, one or more PUCCH transmissions that include the one or more CSI reports.

In some aspects, an apparatus for wireless communication may include means for identifying multiple CSI reports that a UE is scheduled to transmit in a slot on respective PUCCH resources, wherein the multiple CSI reports include one or more CSI reports associated with a first service type and one or more CSI reports associated with a second service type; means for determining, from the multiple CSI reports, one or more CSI reports to be transmitted in the slot based at least in part on a first priority associated with the first service type and a second priority associated with the second service type; and means for receiving, in the slot, one or more PUCCH transmissions that include the one or more CSI reports.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
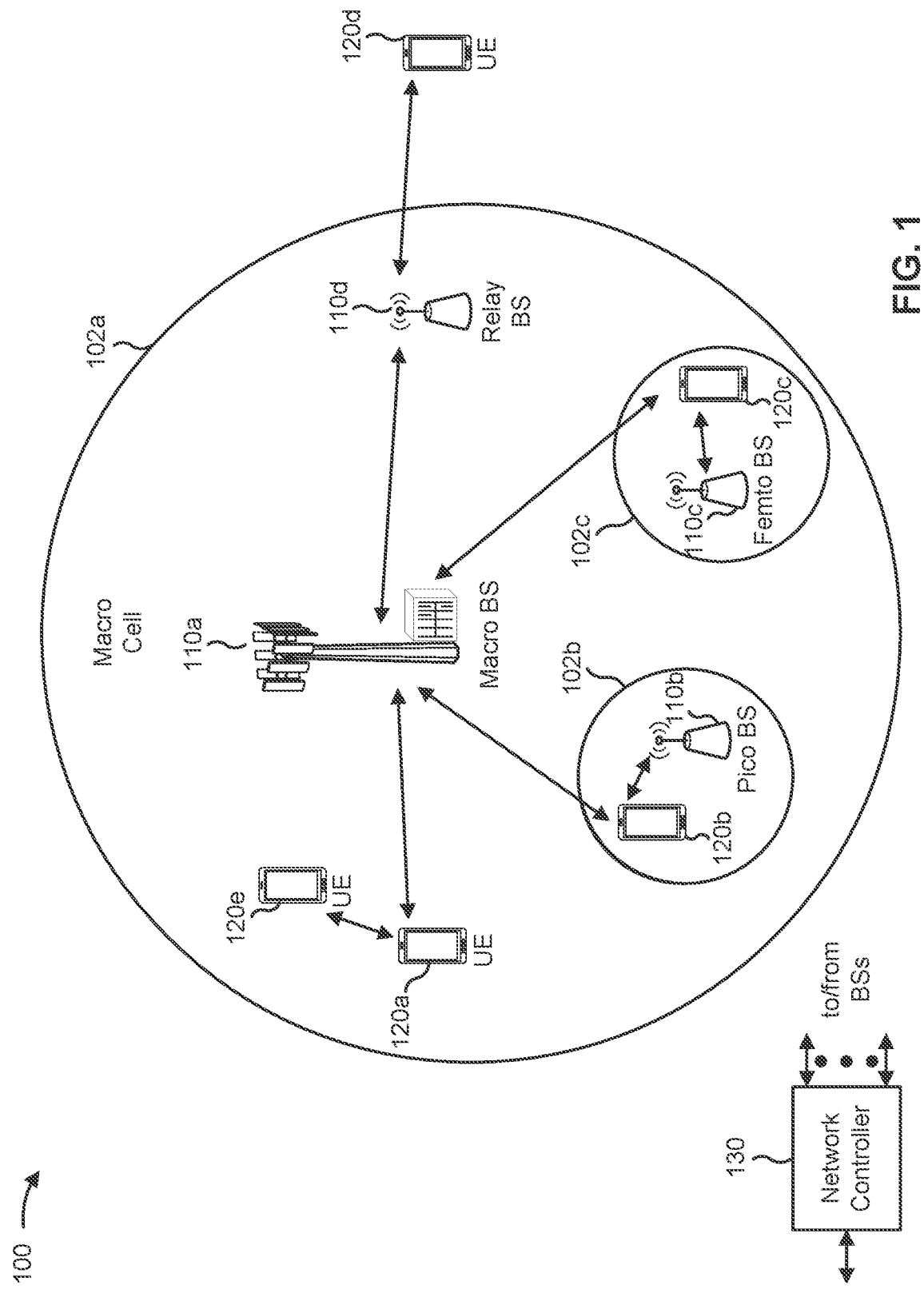
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things)

devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
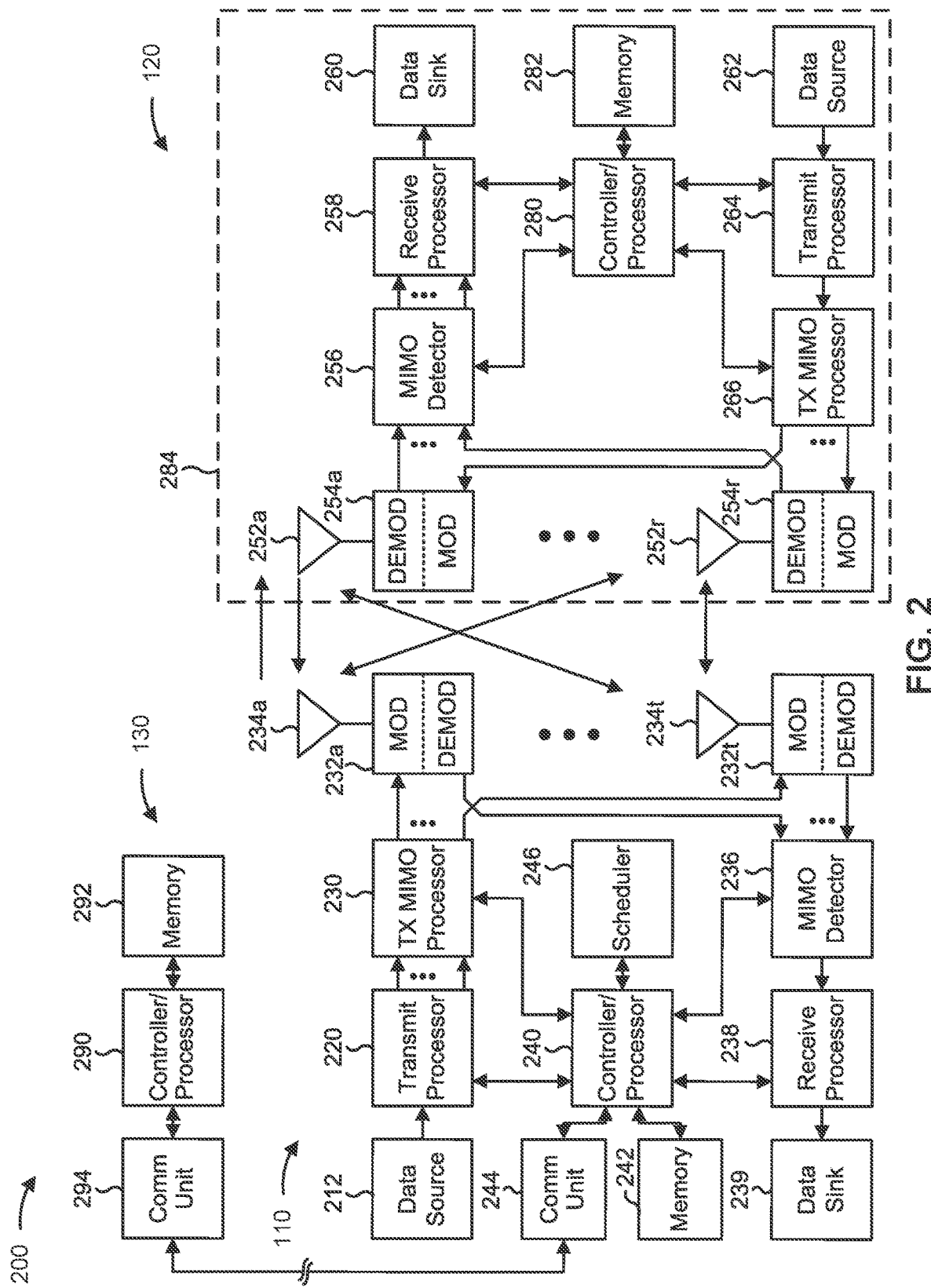
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with collision resolution for channel state information (CSI) reporting on a physical uplink control channel (PUCCH), as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, interpreting the instructions, and/or the like.

In some aspects, UE 120 may include means for identifying multiple CSI reports scheduled to be transmitted in a slot on respective PUCCH resources, wherein the multiple CSI reports include one or more CSI reports associated with a first service type and one or more CSI reports associated with a second service type, means for selecting, from the multiple CSI reports, one or more CSI reports to be transmitted in the slot based at least in part on a first priority associated with the first service type and a second priority associated with the second service type, means for transmitting, in the slot, one or more PUCCH transmissions that include the one or more selected CSI reports, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for identifying multiple CSI reports that a UE is scheduled to transmit in a slot on respective PUCCH resources, wherein the multiple CSI reports include one or more CSI reports associated with a first service type and one or more CSI reports associated with a second service type, means for determining, from the multiple CSI reports, one or more CSI reports to be transmitted in the slot based at least in part on a first priority associated with the first service type and a second priority associated with the second service type, means for receiving, in the slot, one or more PUCCH transmissions that include the one or more CSI reports, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
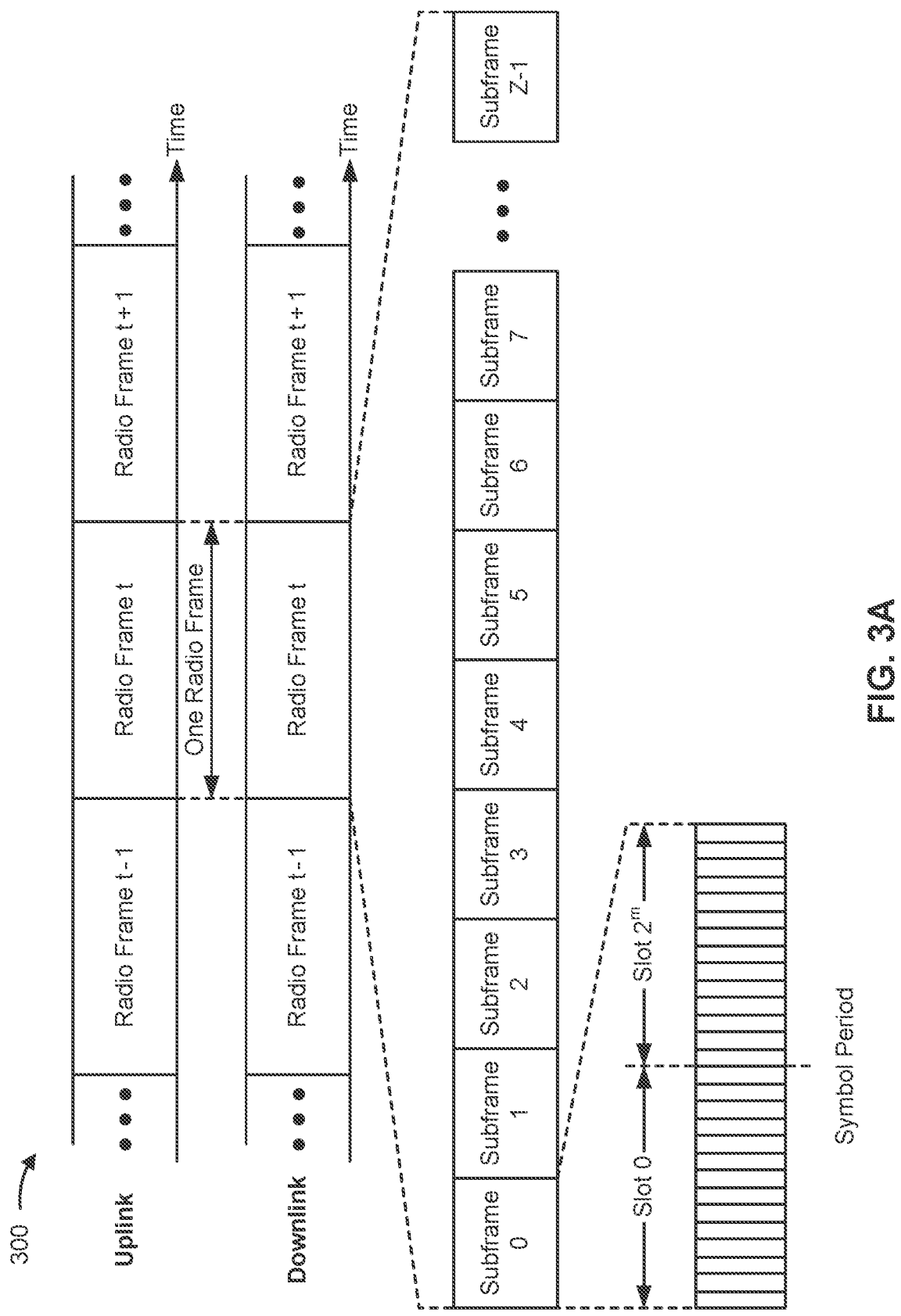
FIG. 3A is a diagram illustrating an example frame structure in a wireless network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
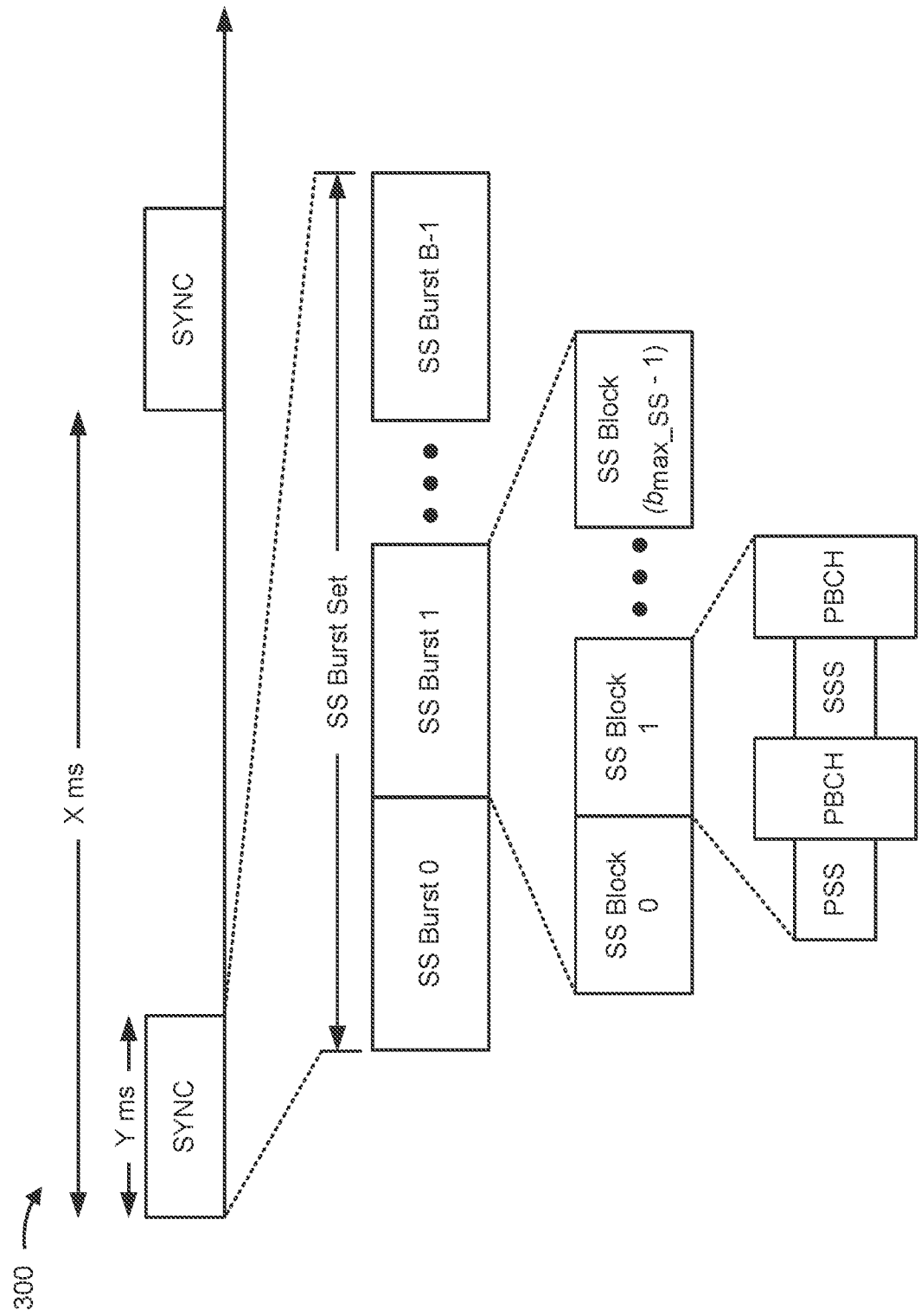
FIG. 3B is a diagram illustrating an example synchronization communication hierarchy in a wireless network, in accordance with various aspects of the present disclosure.

FIG. 3B is a diagram illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
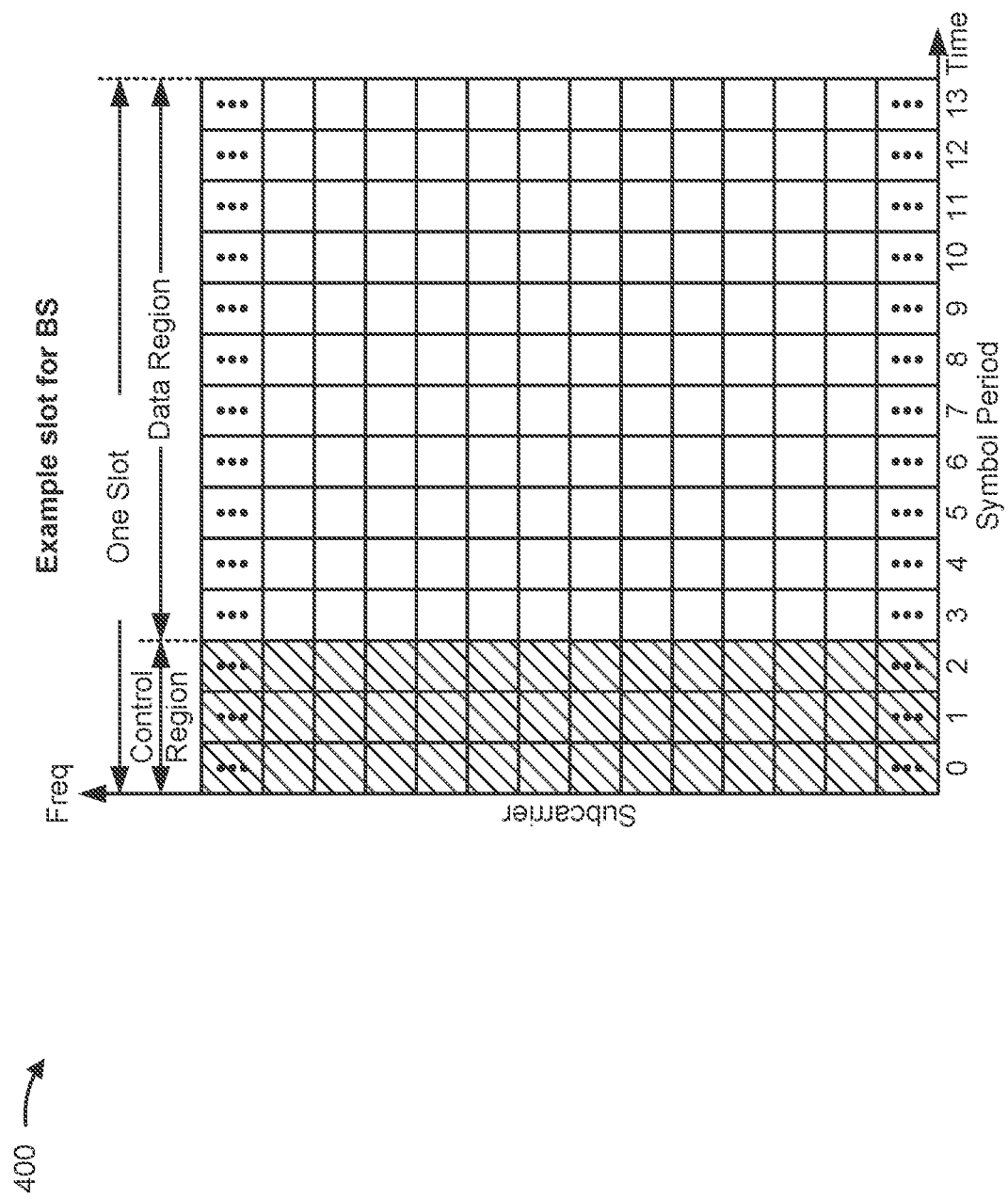
FIG. 4 is a diagram illustrating an example slot format with a normal cyclic prefix, in accordance with various aspects of the present disclosure.

FIG. 4 shows an example slot format 400 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In some aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low-latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
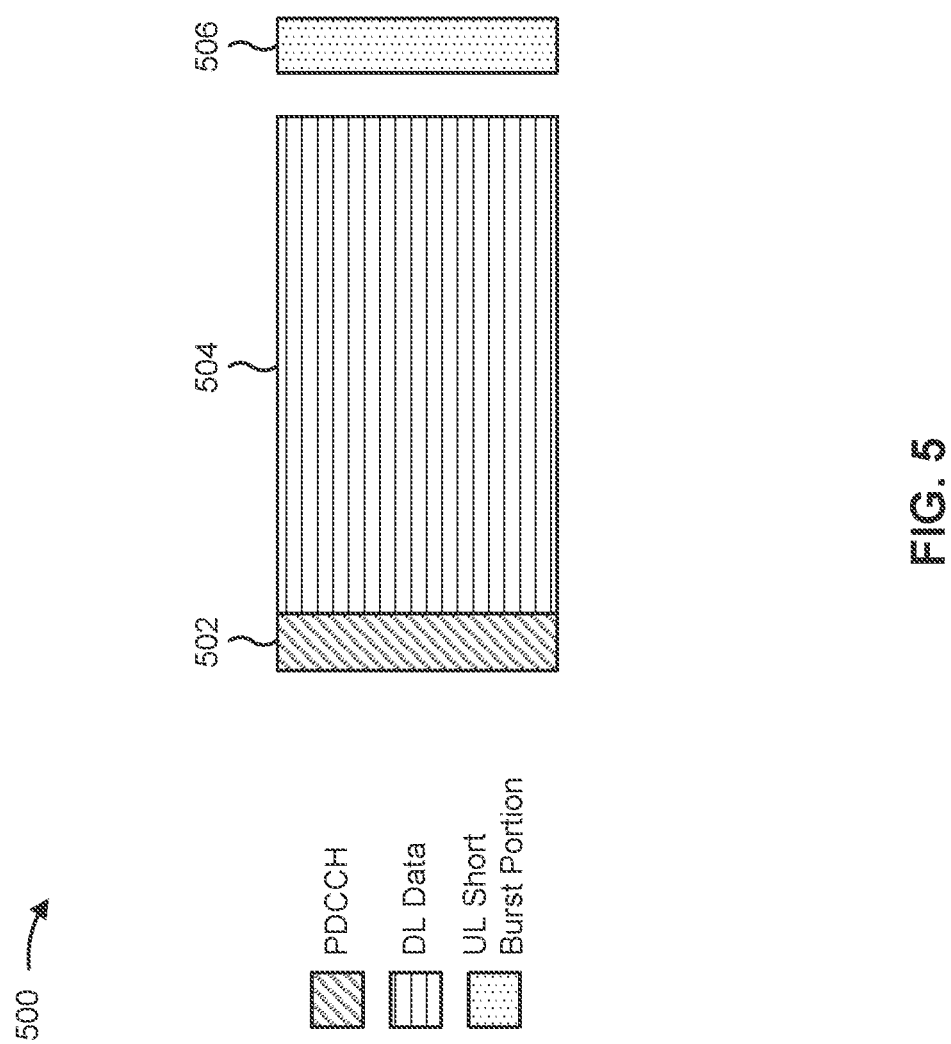
FIG. 5 is a diagram illustrating an example of a downlink-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PD SCH).

The DL-centric slot may also include an uplink (UL) short burst portion 506. The UL short burst portion 506 may sometimes be referred to as an uplink burst, an uplink burst portion, a common UL burst, a short burst, an uplink short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an acknowledgement (ACK) signal (e.g., a PUCCH ACK, a physical uplink shared channel (PUSCH) ACK, an immediate ACK), a negative acknowledgement (NACK) signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 5 is provided as an example. Other examples may differ from what is described with regard to FIG. 5.

Figure 6:
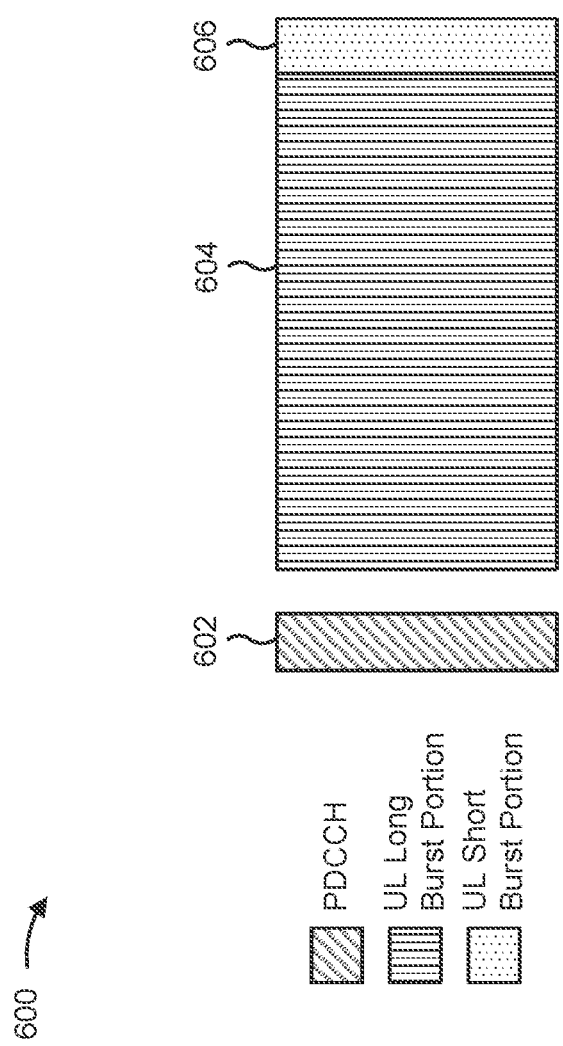
FIG. 6 is a diagram illustrating an example of an uplink-centric slot, in accordance with various aspects of the present disclosure.

FIG. 6 is a diagram 600 showing an example of an uplink (UL)-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an uplink long burst portion 604. The UL long burst portion 604 may sometimes be referred to as the payload of the UL-centric slot. The UL long burst portion 604 may include the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an uplink short burst portion 606. The UL short burst portion 606 in FIG. 6 may be similar to the UL short burst portion 506 described above with reference to FIG. 5, and may include any of the information described above in connection with FIG. 5. The foregoing is one example of an uplink-centric wireless communication structure, and alternative structures having similar features may exist without necessarily deviating from the aspects described herein.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided as an example. Other examples may differ from what is described with regard to FIG. 6.

In some instances, a base station and a UE may communicate with one another via different service types. For example, a first communication between the base station and the UE may use an enhanced mobile broadband (eMBB) service type, a second communication between the base station and the UE may use an ultra-reliable low-latency communication (URLLC) service type, and/or the like. In such cases, the different service types may have different priorities based at least in part on different characteristics and/or requirements, such as different latency and/or reliability requirements (e. g., a URLLC service may have a higher reliability and a lower latency requirement, and thus a higher priority, relative to an eMBB service). In some cases, the base station may configure the UE with respective PUCCH resources to be used to transmit channel state information (CSI) reports for different service types that have different priorities. For example, the CSI reports may be periodic CSI (P-CSI) reports, semi-persistent CSI (SP-CSI) reports, and/or the like. In some cases, the respective PUCCH resources that are configured for the CSI reports associated with the different service types may collide with one another, such as when the respective PUCCH resources are scheduled in the same slot on the same PUCCH carrier.

In such cases, the UE may need to resolve the collision to determine which CSI report(s) to transmit. For example, in cases where none of the PUCCH resources overlap in time, the UE may resolve the collision by selecting up to two non-overlapping PUCCH resources that correspond to CSI reports having a highest priority. Alternatively, in cases where two or more of the PUCCH resources overlap in time, the UE may resolve the collision by multiplexing all of the CSI reports that are scheduled to be transmitted in the slot into a single PUCCH transmission, which is transmitted on one PUCCH resource that has been configured for the UE. However, these approaches generally make no distinction between CSI reports that are associated with different service types (e.g., eMBB versus URLLC). Instead, priorities associated with different CSI reports are typically determined according to a hierarchy that includes factors such as CSI report type (e.g., aperiodic, periodic, semi-persistent, and/or the like), cell identifier, CSI report configuration identifier, and/or the like. Furthermore, multiplexing CSI reports associated with different service types may have a negative effect on reliability, because the multiplexed CSI reports may not differentiate CSI related to the different service types. Accordingly, existing techniques to resolve collisions among multiple CSI reports that are scheduled to be transmitted in a particular slot tend to fall short in adequately taking into consideration different characteristics and/or requirements, such as different latency and/or reliability requirements, associated with different service types.

Some aspects described herein provide techniques and apparatuses to resolve collisions among multiple CSI reports that are associated with different service types and scheduled to be transmitted in the same slot on respective PUCCH resources. In particular, as described in further detail herein, a UE may select, from the multiple CSI reports, one or more CSI reports to be transmitted in the slot based on respective priorities associated with the different service types. For example, in some aspects, a URLLC service type may generally have a higher priority than an eMBB service type. Accordingly, the UE may transmit, in the slot, one or more PUCCH transmissions (e.g., up to two PUCCH transmissions) that include the one or more CSI reports selected to be transmitted based on the respective priorities associated with the different service types. For example, in some aspects, the UE may drop any CSI reports that are associated with a low-priority service type (e.g., an eMBB service type) and then apply one or more rules to select the one or more CSI reports to be transmitted from remaining CSI reports that are associated with a high-priority service type (e.g., a URLLC service type). For example, after dropping the CSI reports associated with the low-priority service type, the UE may select one or more of the remaining CSI reports associated with the high-priority service type that have a highest priority, multiplex the remaining CSI reports associated with the high-priority service type into a single PUCCH transmission, and/or the like. Additionally, or alternatively, in some aspects, the UE may select a subset of the CSI reports that have a highest priority in cases where none of the CSI reports are associated with PUCCH resources that overlap in time. In such cases, at least one CSI report selected to be transmitted in the slot may be associated with the high-priority service type, and the other CSI report(s) selected to be transmitted in the slot may be associated with either the high-priority service type or the low-priority service type.

In this way, a UE may resolve collisions among multiple CSI reports that are to be transmitted in a particular slot based at least in part on service types associated with the multiple CSI reports, which enables the UE to resolve the collisions in a manner that may satisfy different performance requirements associated with the different service types (e.g., prioritizing CSI reports for URLLC service over CSI reports for eMBB service based on the URLLC service having more stringent reliability and/or latency requirements than the eMBB service).

Figure 7A:
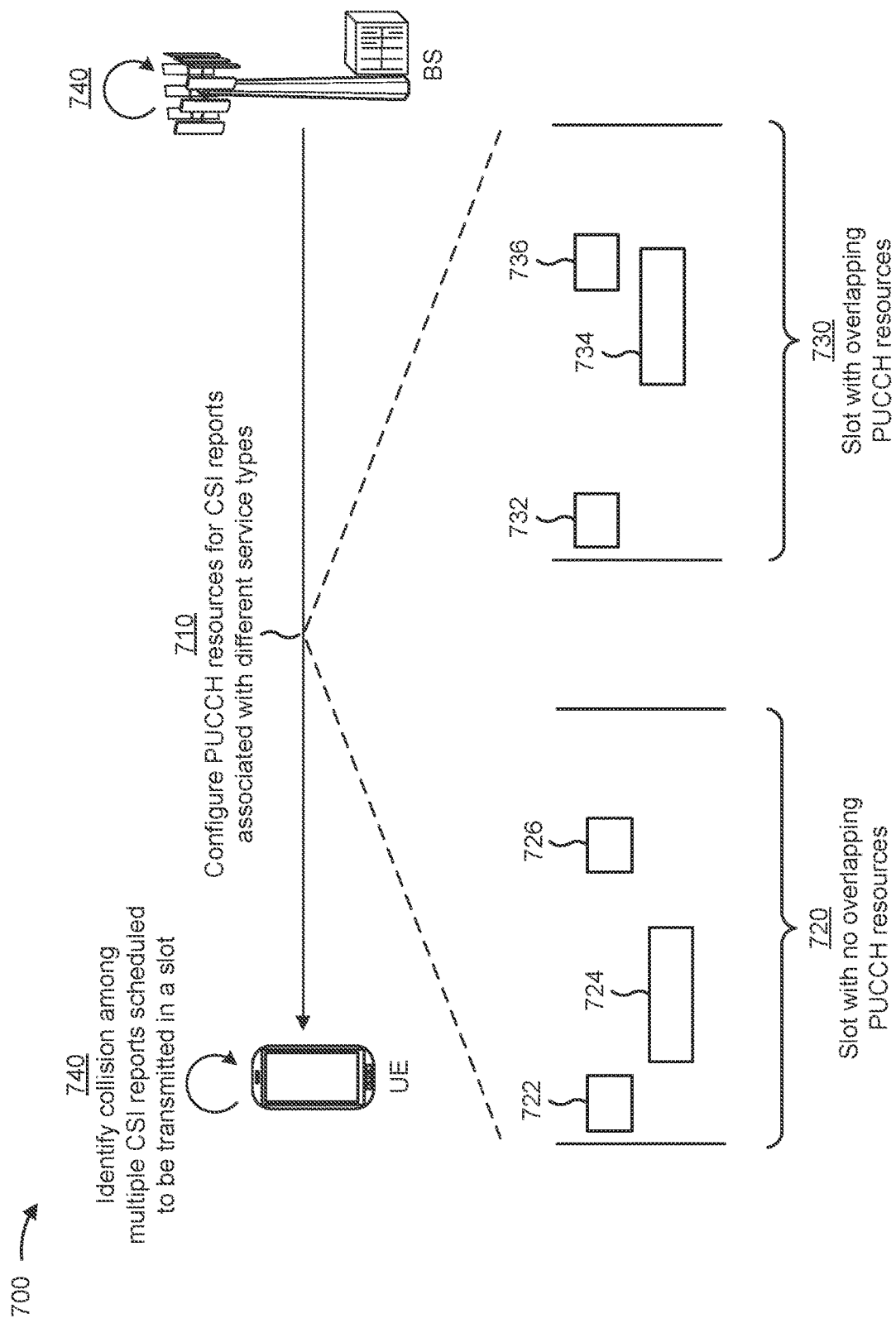
FIGS. 7A-7B are diagrams illustrating an example implementation of collision resolution for channel state information (CSI) reporting on a physical uplink control channel (PUCCH), in accordance with various aspects of the present disclosure.
Figure 7B:
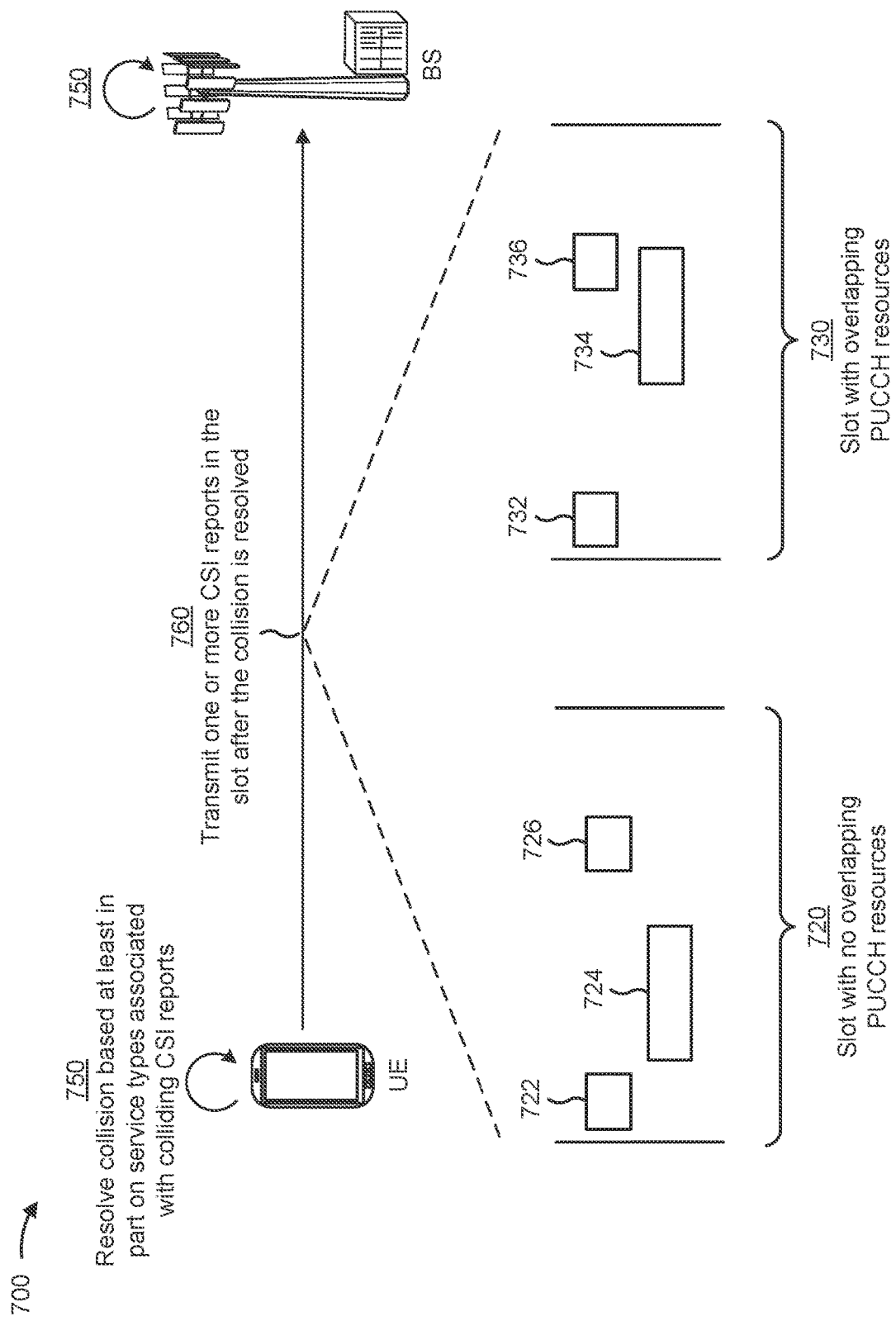

FIGS. 7A-7B are diagrams illustrating an example implementation 700 of collision resolution for CSI reporting on a PUCCH, in accordance with various aspects of the present disclosure. As shown in FIGS. 7A-7B, example implementation 700 includes a UE communicating with a base station. Furthermore, as described herein, the UE may be communicating with the base station using different service types that are associated with different priorities. For example, in some aspects, the UE may communicate with the base station using a first service type having a low priority (e.g., eMBB service) and a second service type having a high priority (e.g., URLLC service). In some aspects, the first service type may be associated with a physical layer priority index having a first value (e.g., zero) and the second service type may be associated with a physical layer priority index having a second value (e.g., one), where the first value may indicate that the first service type has the low priority and the second value may indicate that the second service type has the high priority (e.g., a lower value for the physical layer priority index may indicate a lower priority, and a higher value for the physical layer priority index may indicate a higher priority, or vice versa).

As shown in FIG. 7A, and by reference number 710, the base station may configure the UE with respective PUCCH resources to be used to transmit CSI reports associated with different service types (e.g., eMBB and URLLC). For example, in some aspects, the base station may configure one or more PUCCH resources to be used to transmit one or more CSI reports associated with a first service type (e.g., eMBB), one or more PUCCH resources to be used to transmit one or more CSI reports associated with a second service type (e.g., URLLC), and/or the like. In some aspects, the respective PUCCH resources that are configured for the CSI reports associated with the different service types may be overlapping in time and/or non-overlapping in time. For example, as shown by reference number 720, the UE may be configured with multiple PUCCH resources 722, 724, 726 that correspond to respective CSI reports to be transmitted in the same slot, and none of the PUCCH resources 722, 722, 726 overlap in time. In another example, as shown by reference number 730, the UE may be configured with multiple PUCCH resources 732, 734, 736 that correspond to respective CSI reports to be transmitted in the same slot, and at least two of the PUCCH resources 732, 732, 736 overlap in time (e.g., in the illustrated example, PUCCH resource 734 overlaps in time with respect to PUCCH resource 736).

As further shown in FIG. 7A, and by reference number 740, the UE and the base station may identify a collision among multiple CSI reports that are scheduled to be transmitted in a particular slot. For example, in some aspects, the UE and the base station may generally identify the collision based at least in part on the base station configuring multiple CSI reports on respective PUCCH resources within the same slot. Accordingly, in some aspects, the UE and the base station may identify the collision based at least in part on a single slot including multiple non-overlapping PUCCH resources that correspond to different CSI reports (e.g., as shown by reference number 720), multiple overlapping PUCCH resources that correspond to different CSI reports (e.g., as shown by reference number 730), and/or the like.

As shown in FIG. 7B, and by reference number 750, the UE and the base station may resolve the collision among the multiple CSI reports that are scheduled to be transmitted in the particular slot based at least in part on the respective service types associated with the colliding CSI reports. For example, as mentioned above, the colliding CSI reports may include one or more CSI reports for a first (e.g., low-priority) service type and one or more CSI reports for a second (e.g., high-priority) service type. Accordingly, as described herein, the UE and the base station may employ one or more techniques to resolve the collision and determine which of the CSI reports are to be transmitted and received in the particular slot based at least in part on the respective service types associated with the multiple CSI reports that the UE is scheduled to transmit on respective PUCCH resources associated with the slot, which may be non-overlapping in time, overlapping in time, and/or the like.

In some aspects, in a first technique, the UE and the base station may determine that the UE is to drop each CSI report that is associated with the first (e.g., low-priority) service type and then select the one or more CSI reports to be transmitted in the slot from the remaining CSI reports (e.g., from the one or more CSI reports associated with the second (e.g., high-priority) service type). For example, in cases where the first service type is eMBB and the second service type is URLLC, where the eMBB service type has a lower priority than the URLLC service type, the UE may be configured to drop all CSI reports for the eMBB service type and then select the one or more CSI reports to be transmitted in the slot from the remaining CSI reports that are associated with the URLLC service type. In the first technique, the UE may generally drop all of the CSI reports associated with the low-priority service type regardless of whether the PUCCH resources for the colliding CSI reports are overlapping or not. Accordingly, in the first technique, the UE may drop all of the CSI reports associated with the low-priority service type when one or more CSI reports for the low-priority service type and one or more CSI reports for the high-priority service type are scheduled to be transmitted on PUCCH resources that are within the same slot. Furthermore, as mentioned above, the UE may select the one or more CSI reports to transmit in the slot from the remaining CSI reports associated with the high-priority service type after dropping the CSI reports associated with the low-priority service type. For example, as described herein, the UE and the base station may employ different approaches to determine the CSI report(s) to be transmitted in the slot depending on whether PUCCH resources associated with the remaining CSI reports are overlapping in time or non-overlapping in time.

For example, in cases where the PUCCH resources associated with the remaining CSI reports are non-overlapping and/or the UE has not been configured with a higher layer (e.g., a radio resource control (RRC) layer) parameter that provides a list of PUCCH resources to be used for multiplexing or otherwise combining multiple CSI reports (e.g., a multi-CSI-PUCCH-resourceList parameter), the UE may select one or more (typically up to two) non-overlapping PUCCH resources with a highest priority. For example, in some aspects, priorities associated with the PUCCH resources may generally be defined according to a hierarchy, where a first level in the hierarchy may be a service type (e.g., prioritizing URLLC over eMBB), and subsequent levels in the hierarchy may include a CSI report type (e.g., where aperiodic CSI reports have a higher priority than semi-persistent CSI reports, semi-persistent CSI reports have a higher priority than periodic CSI reports, and/or the like), a cell identifier, a CSI report configuration identifier, and/or the like. Accordingly, to select among the CSI reports that are associated with the high-priority service type, the UE may select a first PUCCH resource that corresponds to one of the CSI reports associated with the high-priority service type that has a highest priority (e.g., based on CSI report type, cell identifier, CSI report configuration identifier, and/or the like). Furthermore, in cases where there are multiple CSI reports associated with the high-priority service type, the UE may select a second PUCCH resource that corresponds to a highest priority CSI report among all remaining PUCCH resources that do not overlap with the first PUCCH resource that corresponds to the CSI report that has the highest priority.

Alternatively, if the PUCCH resources associated with the remaining CSI reports are overlapping and the UE has been configured with the higher layer parameter that provides the list of PUCCH resources to be used for multiplexing or otherwise combining multiple CSI reports, the UE may multiplex all of the CSI reports associated with the high-priority service type into one PUCCH transmission. Accordingly, in such cases, the UE may transmit the one PUCCH transmission that includes the multiplexed high-priority CSI reports on one configured PUCCH resource that is selected from the list of PUCCH resources to be used for multiplexing or otherwise combining multiple CSI reports (e.g., based at least in part on which PUCCH resource in the list best suits a payload size of the multiplexed CSI reports, as indicated in an RRC parameter, such as a multi-CSI-PUCCH-resourceList parameter). Furthermore, the UE does not multiplex the CSI report(s) associated with the low-priority service type and the CSI report(s) associated with the high-priority service type in the same PUCCH transmission. Instead, the UE may generally use the PUCCH resources configured in the higher-layer RRC parameter (e.g., multi-CSI-PUCCH-resourceList) to transmit multiplexed CSI reports associated with the high-priority service type (e.g., URLLC) or to transmit multiplexed CSI reports associated with the low-priority service type (e.g., eMBB). In this way, the base station does not need to configure separate PUCCH resources to multiplex CSI reports associated with the high-priority service type or to multiplex CSI reports associated with the low-priority service type, as each service type may rely on the same RRC parameter (e.g., for multiplexing URLLC CSI reports in cases where all eMBB CSI reports are initially dropped, or for multiplexing eMBB CSI reports in cases where no URLLC CSI reports are scheduled in the slot and two or more eMBB CSI reports are scheduled in the same slot on PUCCH resources that overlap in time).

Additionally, or alternatively, in a second technique, the UE and the base station may resolve the collision among the multiple CSI reports that are scheduled to be transmitted on respective PUCCH resources in the same slot by initially determining whether the respective PUCCH resources associated with the multiple CSI reports are overlapping in time or non-overlapping in time.

For example, when applying the second technique in cases where the colliding CSI reports are scheduled to be transmitted on non-overlapping PUCCH resources (e.g., as in the case of the example slot shown by reference number 720), the UE may select one or more (typically up to two) non-overlapping PUCCH resources with a highest priority. For example, in a similar manner as described above, the priorities associated with the PUCCH resources may generally be defined according to a hierarchy, where a first level in the hierarchy may be a service type (e.g., prioritizing URLLC over eMBB), and subsequent levels in the hierarchy may include a CSI report type, a cell identifier, a CSI report configuration identifier, and/or the like. Accordingly, to select the one or more CSI reports that have the highest priority, the UE may select a first PUCCH resource that corresponds to one of the CSI reports associated with the high-priority service type. In some aspects, the UE may then select a second PUCCH resource that corresponds to one of the remaining CSI reports that has a highest priority. For example, if the remaining CSI reports include one or more CSI reports associated with the high-priority service type, the second CSI report may be one of the remaining CSI reports that is associated with the high-priority service type and has a highest priority based on CSI report type, cell identifier, CSI report configuration identifier, and/or the like. Alternatively, in cases where the colliding CSI reports include only one CSI report associated with the high-priority service type, the second CSI report may be one of the remaining CSI reports that is associated with the low-priority service type (e.g., eMBB) and has a highest priority based on CSI report type, cell identifier, CSI report configuration identifier, and/or the like. In other words, when the colliding CSI reports are non-overlapping in time, the first CSI report may be associated with the high-priority service type and the second CSI report may be associated with either the high-priority service type (e.g., where the colliding CSI reports include two or more CSI reports associated with the high-priority service type) or the low-priority service type (e.g., where the colliding CSI reports include only one CSI report associated with the high-priority service type and one or more CSI reports associated with the low-priority service type).

Alternatively, when applying the second technique in cases where the colliding CSI reports include two or more CSI reports that are scheduled to be transmitted on PUCCH resources that overlap in time (e.g., as in the case of the example slot shown by reference number 730), the UE may drop each CSI report that is associated with the low-priority service type (e.g., eMBB) and then select the one or more CSI reports to be transmitted in the slot from the remaining CSI reports associated with the high-priority service type (e.g., URLLC). For example, in cases where the PUCCH resources associated with the remaining CSI reports associated with the high-priority service type are non-overlapping (after the CSI report(s) associated with the low-priority service type are dropped), the UE may select one or more (typically up to two) of the non-overlapping PUCCH resources with a highest priority (e.g., according to the hierarchy described above). Alternatively, if the PUCCH resources associated with the remaining CSI reports that are associated with the high-priority service type are still overlapping in time after the CSI report(s) associated with the low-priority service type are dropped, the UE may multiplex all of the CSI reports associated with the high-priority service type into one PUCCH transmission. In such cases, the UE may transmit the one PUCCH transmission that includes the multiplexed CSI reports on one configured PUCCH resource that is selected from a list of PUCCH resources to be used for multiplexing or otherwise combining multiple CSI reports (e.g., as indicated in an RRC parameter, such as a multi-CSI-PUCCH-resourceList parameter).

As further shown in FIG. 7B, and by reference number 760, the UE may transmit, and the base station may receive, the one or more CSI reports that are selected from the multiple CSI reports scheduled to be transmitted in the slot after resolving the collision among the multiple CSI reports. For example, in cases where the PUCCH resources corresponding to the selected CSI reports are non-overlapping in time, the UE may transmit one or more PUCCH transmissions that include the selected CSI reports on the corresponding PUCCH resources. Alternatively, in cases where the PUCCH resources corresponding to the selected CSI reports are overlapping in time, the UE may multiplex the selected CSI reports into one PUCCH transmission, which may be transmitted on one PUCCH resource that is selected from the list of configured PUCCH resources to be used for transmitting multiple CSI reports that are multiplexed or otherwise combined. Furthermore, in some aspects, the UE may determine whether there are one or more other uplink transmissions in the slot that overlap with the PUCCH resources to be used for transmitting the CSI reports (e.g., other PUCCH transmissions, PUSCH transmissions, SRS transmissions, physical random access channel (PRACH) transmissions, and/or the like). In such cases, the UE may initially resolve the collision among the multiple CSI reports that are scheduled in the slot in the manner described in further detail above, and then use any suitable technique(s) to resolve any further collision(s) between the surviving CSI reports and the other uplink transmissions before transmitting the selected CSI reports on the corresponding PUCCH resources.

As indicated above, FIG. 7 is provided as an example. Other examples may differ from what is described with respect to FIG. 7.

Figure 8:
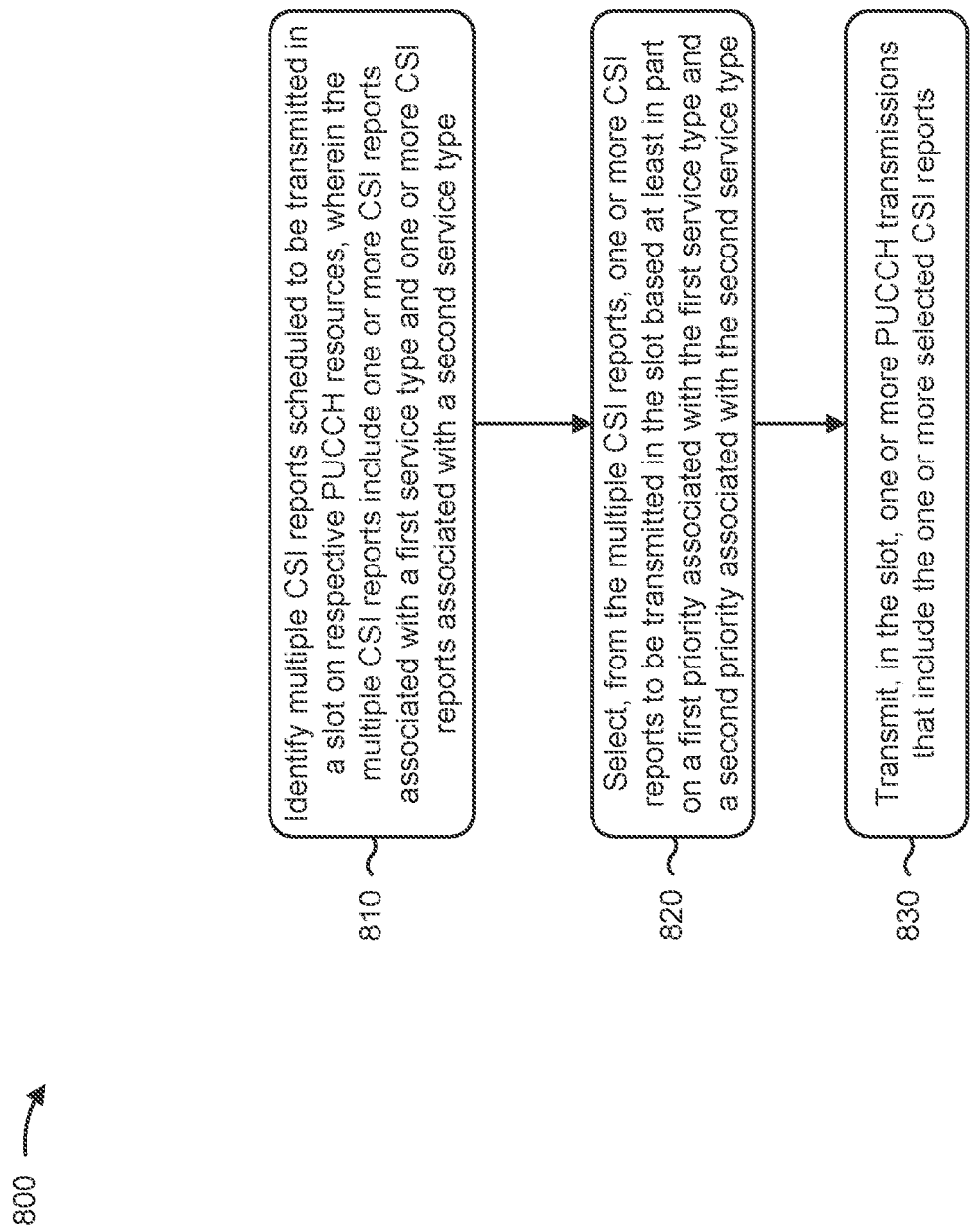
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with collision resolution for CSI reporting on a PUCCH.

As shown in FIG. 8, in some aspects, process 800 may include identifying multiple CSI reports scheduled to be transmitted in a slot on respective PUCCH resources, wherein the multiple CSI reports include one or more CSI reports associated with a first service type and one or more CSI reports associated with a second service type (block 810). For example, the UE may identify (e.g., using controller/processor 280, memory 282, and/or the like) multiple CSI reports scheduled to be transmitted in a slot on respective PUCCH resources, as described above. In some aspects, the multiple CSI reports include one or more CSI reports associated with a first service type and one or more CSI reports associated with a second service type.

As further shown in FIG. 8, in some aspects, process 800 may include selecting, from the multiple CSI reports, one or more CSI reports to be transmitted in the slot based at least in part on a first priority associated with the first service type and a second priority associated with the second service type (block 820). For example, the UE may select (e.g., using controller/processor 280, memory 282, and/or the like), from the multiple CSI reports, one or more CSI reports to be transmitted in the slot based at least in part on a first priority associated with the first service type and a second priority associated with the second service type, as described above.

As further shown in FIG. 8, in some aspects, process 800 may include transmitting, in the slot, one or more PUCCH transmissions that include the one or more selected CSI reports (block 830). For example, the UE may transmit (e.g., using controller/processor 280, transmit processor 264, TX MIMO processor 266, MOD 254, antenna 252, and/or the like), in the slot, one or more PUCCH transmissions that include the one or more selected CSI reports, as described above.

Process 800 may include additional aspects, such as any single aspect or any combination of aspects described below and/or in connection with one or more other processes described elsewhere herein.

In a first aspect, selecting the one or more CSI reports to be transmitted in the slot includes dropping the one or more CSI reports associated with the first service type based at least in part on determining that the first priority associated with the first service type is lower than the second priority associated with the second service type, and selecting the one or more CSI reports to be transmitted in the slot from the one or more CSI reports associated with the second service type.

In a second aspect, alone or in combination with the first aspect, selecting the one or more CSI reports to be transmitted in the slot further includes determining that the one or more CSI reports associated with the second service type include two or more CSI reports, where the one or more CSI reports that are selected to be transmitted in the slot include two of the two or more CSI reports associated with the second service type that have a highest priority based at least in part on determining that none of the two or more CSI reports are associated with PUCCH resources that overlap in time.

In a third aspect, alone or in combination with one or more of the first and second aspects, transmitting the one or more CSI reports in the slot includes multiplexing the one or more CSI reports associated with the second service type into one PUCCH based at least in part on determining that the one or more CSI reports associated with the second service type include two or more CSI reports that are associated with PUCCH resources that overlap in time, and transmitting the one PUCCH in the slot on one configured PUCCH resource.

In a fourth aspect, alone or in combination with one or more of the first through third aspects, selecting the one or more CSI reports to be transmitted in the slot includes dropping the one or more CSI reports associated with the first service type based at least in part on determining that the multiple CSI reports scheduled to be transmitted in the slot include at least two CSI reports that are associated with PUCCH resources that overlap in time, and selecting the one or more CSI reports to be transmitted in the slot from the one or more CSI reports associated with the second service type.

In a fifth aspect, alone or in combination with one or more of the first through fourth aspects, the one or more CSI reports that are selected to be transmitted in the slot include two CSI reports, of the multiple CSI reports, that have a highest priority, based at least in part on determining that none of the multiple CSI reports are associated with PUCCH resources that overlap in time.

In a sixth aspect, alone or in combination with one or more of the first through fifth aspects, the two CSI reports that have the highest priority include a first CSI report associated with the second service type and a second CSI report associated with either the first service type or the second service type.

In a seventh aspect, alone or in combination with one or more of the first through sixth aspects, the one or more CSI reports to be transmitted in the slot are selected further based at least in part on one or more of report types, cell identifiers, or configuration identifiers associated with the multiple CSI reports.

In an eighth aspect, alone or in combination with one or more of the first through seventh aspects, the first service type is eMBB and the second service type is URLLC.

In a ninth aspect, alone or in combination with one or more of the first through eighth aspects, process 800 further includes resolving one or more collisions between the one or more CSI reports that are selected to be transmitted in the slot and one or more additional uplink transmissions that are scheduled in the slot after the one or more CSI reports are selected.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
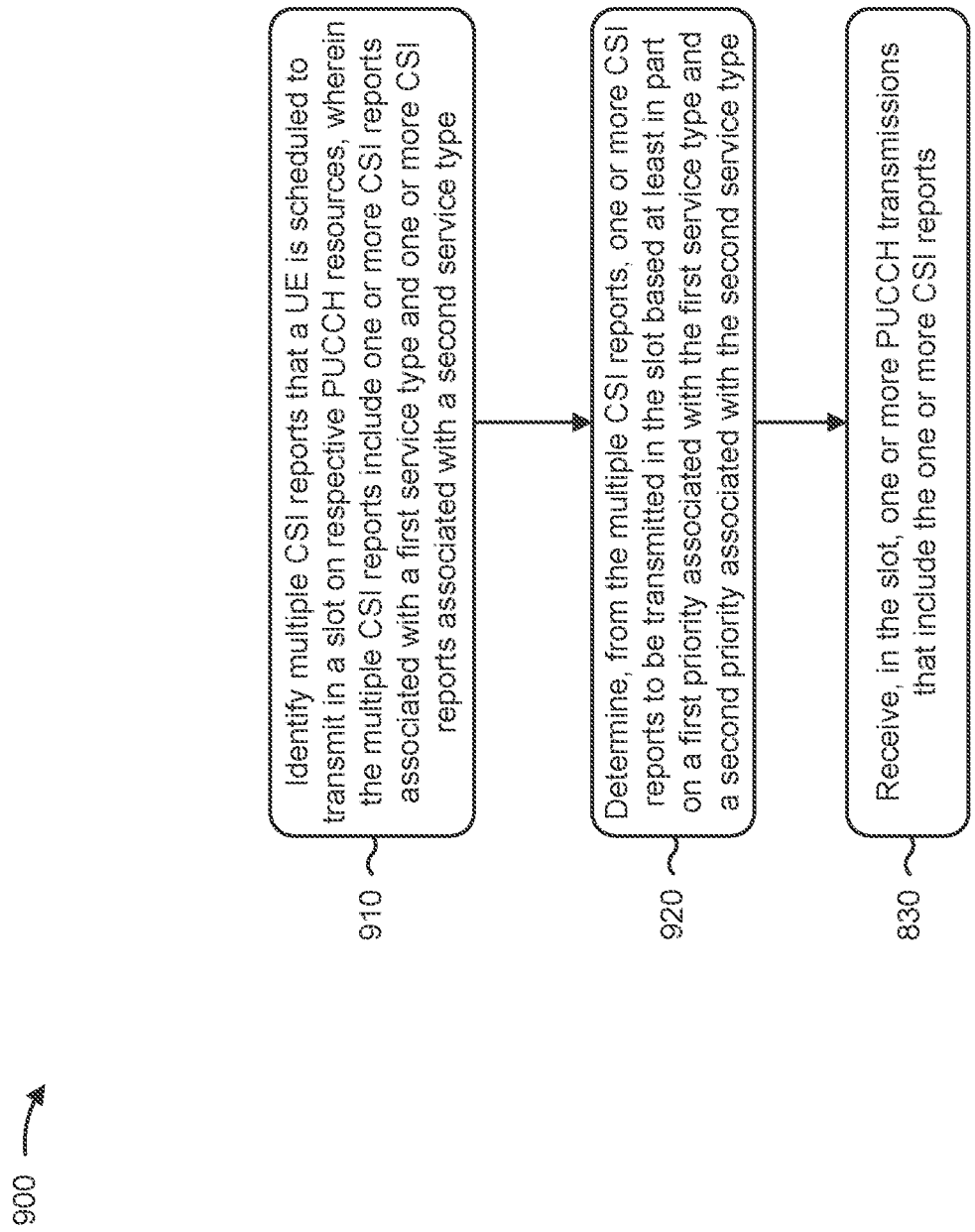
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where the base station (e.g., base station 110 and/or the like) performs operations associated with collision resolution for CSI reporting on a PUCCH.

As shown in FIG. 9, in some aspects, process 900 may include identifying multiple CSI reports that a UE is scheduled to transmit in a slot on respective PUCCH resources, wherein the multiple CSI reports include one or more CSI reports associated with a first service type and one or more CSI reports associated with a second service type (block 910). For example, the base station (e.g., using controller/processor 240, memory 242, and/or the like) may identify multiple CSI reports that a UE is scheduled to transmit in a slot on respective PUCCH resources, wherein the multiple CSI reports include one or more CSI reports associated with a first service type and one or more CSI reports associated with a second service type, as described above.

As further shown in FIG. 9, in some aspects, process 900 may include determining, from the multiple CSI reports, one or more CSI reports to be transmitted in the slot based at least in part on a first priority associated with the first service type and a second priority associated with the second service type (block 920). For example, the base station (e.g., using controller/processor 240, memory 242, and/or the like) may determine, from the multiple CSI reports, one or more CSI reports to be transmitted in the slot based at least in part on a first priority associated with the first service type and a second priority associated with the second service type, as described above.

As further shown in FIG. 9, in some aspects, process 900 may include receiving, in the slot, one or more PUCCH transmissions that include the one or more CSI reports (block 930). For example, the base station (e.g., using antenna 234, DEMOD 232, MIMO detector 236, receive processor 238, controller/processor 240, memory 242, and/or the like) may receive, in the slot, one or more PUCCH transmissions that include the one or more CSI reports, as described above.

Process 900 may include additional aspects, such as any single aspect or any combination of aspects described below and/or in connection with one or more other processes described elsewhere herein.

In a first aspect, determining the one or more CSI reports to be transmitted in the slot includes determining that the UE is to drop the one or more CSI reports associated with the first service type based at least in part on determining that the first priority associated with the first service type is lower than the second priority associated with the second service type, and determining the one or more CSI reports to be transmitted in the slot from the one or more CSI reports associated with the second service type.

In a second aspect, alone or in combination with the first aspect, determining the one or more CSI reports to be transmitted in the slot includes determining that the one or more CSI reports associated with the second service type include two or more CSI reports, wherein the one or more CSI reports that are transmitted in the slot include two of the two or more CSI reports associated with the second service type that have a highest priority based at least in part on determining that none of the two or more CSI reports are associated with PUCCH resources that overlap in time.

In a third aspect, alone or in combination with one or more of the first and second aspects, receiving the one or more CSI reports in the slot includes receiving one PUCCH in the slot on one configured PUCCH resource, wherein the one or more CSI reports associated with the second service type are multiplexed into the one PUCCH based at least in part on the one or more CSI reports associated with the second service type including two or more CSI reports that are associated with PUCCH resources that overlap in time.

In a fourth aspect, alone or in combination with one or more of the first through third aspects, determining the one or more CSI reports to be transmitted in the slot includes determining that the UE is to drop the one or more CSI reports associated with the first service type based at least in part on determining that the multiple CSI reports scheduled to be transmitted in the slot include at least two CSI reports that are associated with PUCCH resources that overlap in time, and determining the one or more CSI reports to be transmitted in the slot from the one or more CSI reports associated with the second service type.

In a fifth aspect, alone or in combination with one or more of the first through fourth aspects, the one or more CSI reports that are transmitted in the slot include two CSI reports, of the multiple CSI reports, that have a highest priority, based at least in part on determining that none of the multiple CSI reports are associated with PUCCH resources that overlap in time.

In a sixth aspect, alone or in combination with one or more of the first through fifth aspects, the two CSI reports that have the highest priority include a first CSI report associated with the second service type and a second CSI report associated with either the first service type or the second service type.

In a seventh aspect, alone or in combination with one or more of the first through sixth aspects, the one or more CSI reports to be transmitted in the slot are determined further based at least in part on one or more of report types, cell identifiers, or configuration identifiers associated with the multiple CSI reports.

In an eighth aspect, alone or in combination with one or more of the first through seventh aspects, the first service type is enhanced mobile broadband and the second service type is ultra-reliable low-latency communications.

In a ninth aspect, alone or in combination with one or more of the first through eighth aspects, process 900 includes resolving one or more collisions between the one or more CSI reports that are selected to be transmitted in the slot and one or more additional uplink transmissions that are scheduled in the slot after the one or more CSI reports are determined.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   identifying multiple channel state information (CSI) reports scheduled to be transmitted in a slot on respective physical uplink control channel (PUCCH) resources, wherein the multiple CSI reports include one or more CSI reports associated with a first service type and one or more CSI reports associated with a second service type;
   selecting, from the multiple CSI reports, one or more CSI reports to be transmitted in the slot based at least in part on whether the UE is configured with a radio resource control (RRC) parameter that specifies resources for multiplexing CSI reports, a first priority associated with the first service type, and a second priority associated with the second service type,
      wherein the one or more CSI reports associated with the first service type do not overlap in time with the one or more CSI reports associated with the second service type in the slot, and
      wherein selecting the one or more CSI reports to be transmitted in the slot includes:
         dropping the one or more CSI reports associated with the first service type based at least in part on the one or more CSI reports associated with the second service type being scheduled for transmission in the slot, regardless of whether the one or more CSI reports associated with the first service type overlap in time with the one or more CSI reports associated with the second service type in the slot, and based at least in part on determining that the first priority associated with the first service type is lower than the second priority associated with the second service type; and
      selecting the one or more CSI reports to be transmitted in the slot, from the one or more CSI reports associated with the second service type, based on one or more levels of a priority hierarchy associated with the respective PUCCH resources,
         the one or more levels of the priority hierarchy corresponding to an evaluation of at least one of a cell identifier, a CSI report configuration identifier, or CSI report type; and
   transmitting, in the slot based at least in part on the RRC parameter, one or more PUCCH transmissions that include the one or more selected CSI reports.

2. The method of claim 1, wherein selecting the one or more CSI reports to be transmitted in the slot further includes:
   determining that the one or more CSI reports associated with the second service type include two or more CSI reports, wherein the one or more CSI reports that are selected to be transmitted in the slot include two of the two or more CSI reports associated with the second service type that have a highest priority based at least in part on determining that none of the two or more CSI reports are associated with PUCCH resources that overlap in time.

3. The method of claim 1, wherein transmitting the one or more CSI reports in the slot includes:
   multiplexing the one or more CSI reports associated with the second service type into one PUCCH based at least in part on determining that the one or more CSI reports associated with the second service type include two or more CSI reports that are associated with PUCCH resources that overlap in time; and
   transmitting the one PUCCH in the slot on one configured PUCCH resource.

4. The method of claim 1, wherein the multiple CSI reports scheduled to be transmitted in the slot include at least two CSI reports that are associated with PUCCH resources that overlap in time.

5. The method of claim 1, wherein the one or more CSI reports that are selected to be transmitted in the slot include two CSI reports, of the multiple CSI reports, that have a highest priority, based at least in part on determining that none of the multiple CSI reports are associated with PUCCH resources that overlap in time.

6. The method of claim 1, wherein the first service type is enhanced mobile broadband and the second service type is ultra-reliable low-latency communications.

7. The method of claim 1, further comprising:
   resolving one or more collisions between the one or more CSI reports that are selected to be transmitted in the slot and one or more additional uplink transmissions that are scheduled in the slot after the one or more CSI reports are selected.

8. The method of claim 1, wherein the one or more selected CSI reports include multiple CSI reports; and
   the method further comprises:
      multiplexing at least two of the multiple CSI reports, using the resources for multiplexing the CSI reports, based at least in part on the RRC parameter and payload sizes of the multiple CSI reports.

9. A user equipment (UE) for wireless communication, comprising:
   a memory; and
   one or more processors coupled to the memory, the one or more processors configured to:
      identify multiple channel state information (CSI) reports scheduled to be transmitted in a slot on respective physical uplink control channel (PUCCH) resources, wherein the multiple CSI reports include one or more CSI reports associated with a first service type and one or more CSI reports associated with a second service type;
      select, from the multiple CSI reports, one or more CSI reports to be transmitted in the slot based at least in part on whether the UE is configured with a radio resource control (RRC) parameter that specifies resources for multiplexing the CSI reports, a first priority associated with the first service type, and a second priority associated with the second service type, wherein the one or more CSI reports associated with the first service type do not overlap in time with the one or more CSI reports associated with the second service type in the slot, and wherein the one or more processors, when selecting the one or more CSI reports to be transmitted in the slot, are further configured to:

drop the one or more CSI reports associated with the first service type based at least in part on the one or more CSI reports associated with the second service type being scheduled for transmission in the slot, regardless of whether the one or more CSI reports associated with the first service type overlap in time with the one or more CSI reports associated with the second service type in the slot, and based at least in part on determining that the first priority associated with the first service type is lower than the second priority associated with the second service type; and select the one or more CSI reports to be transmitted in the slot, from the one or more CSI reports associated with the second service type, based on one or more levels of a priority hierarchy associated with the respective PUCCH resources, the one or more levels of the priority hierarchy corresponding to an evaluation of at least one of a cell identifier, a CSI report configuration identifier, or CSI report type; and transmit, in the slot based at least in part on the RRC parameter, one or more PUCCH transmissions that include the one or more selected CSI reports.

10. The UE of claim 9, wherein the multiple CSI reports scheduled to be transmitted in the slot include at least two CSI reports that are associated with PUCCH resources that overlap in time.

11. The UE of claim 9, wherein the one or more CSI reports that are selected to be transmitted in the slot include two CSI reports, of the multiple CSI reports, that have a highest priority, based at least in part on determining that none of the multiple CSI reports are associated with PUCCH resources that overlap in time.

12. The UE of claim 9, wherein the one or more processors are further configured to:

resolve one or more collisions between the one or more CSI reports that are selected to be transmitted in the slot and one or more additional uplink transmissions that are scheduled in the slot after the one or more CSI reports are selected.

13. The UE of claim 9, wherein the one or more selected CSI reports include multiple CSI reports; and wherein the one or more processors are further configured to:

multiplex at least two of the multiple CSI reports, using the resources for multiplexing the CSI reports, based at least in part on the RRC parameter and payload sizes of the multiple CSI reports.

14. A method of wireless communication performed by a network entity, comprising:

identifying multiple channel state information (CSI) reports that a user equipment (UE) is scheduled to transmit in a slot on respective physical uplink control channel (PUCCH) resources, wherein the multiple CSI reports include one or more CSI reports associated with a first service type and one or more CSI reports associated with a second service type;

determining, from the multiple CSI reports, one or more CSI reports to be transmitted in the slot based at least in part on whether the UE is configured with a radio resource control (RRC) parameter that specifies resources for multiplexing the CSI reports, a first priority associated with the first service type, and a second priority associated with the second service type, wherein the one or more CSI reports associated with the first service type do not overlap in time with the one or more CSI reports associated with the second service type in the slot, and wherein determining the one or more CSI reports to be transmitted in the slot includes:

determining that the UE is to drop the one or more CSI reports associated with the first service type based at least in part on the one or more CSI reports associated with the second service type being scheduled for transmission in the slot, regardless of whether the one or more CSI reports associated with the first service type overlap in time with the one or more CSI reports associated with the second service type in the slot, and based at least in part on the first priority associated with the first service type being lower than the second priority associated with the second service type; and determining the one or more CSI reports to be transmitted in the slot from the one or more CSI reports associated with the second service type, based on one or more levels of a priority hierarchy associated with the respective PUCCH resources, the one or more levels of the priority hierarchy corresponding to an evaluation of at least one of a cell identifier, a CSI report configuration identifier, or CSI report type; and receiving, in the slot, one or more PUCCH transmissions that include the one or more CSI reports.

15. The method of claim 14, wherein determining the one or more CSI reports to be transmitted in the slot includes:

determining that the one or more CSI reports associated with the second service type include two or more CSI reports, wherein the one or more CSI reports that are transmitted in the slot include two of the two or more CSI reports associated with the second service type that have a highest priority based at least in part on determining that none of the two or more CSI reports are associated with PUCCH resources that overlap in time.

16. The method of claim 14, wherein receiving the one or more CSI reports in the slot includes:

receiving one PUCCH in the slot on one configured PUCCH resource, wherein the one or more CSI reports associated with the second service type are multiplexed into the one PUCCH based at least in part on the one or more CSI reports associated with the second service type including two or more CSI reports that are associated with PUCCH resources that overlap in time.

17. The method of claim 14, wherein the multiple CSI reports scheduled to be transmitted in the slot include at least two CSI reports that are associated with PUCCH resources that overlap in time.

18. The method of claim 14, wherein the one or more CSI reports that are transmitted in the slot include two CSI reports, of the multiple CSI reports, that have a highest priority, based at least in part on determining that none of the multiple CSI reports are associated with PUCCH resources that overlap in time.

19. The method of claim 14, wherein the first service type is enhanced mobile broadband and the second service type is ultra-reliable low-latency communications.

20. The method of claim 14, further comprising:
resolving one or more collisions between the one or more CSI reports that are selected to be transmitted in the slot and one or more additional uplink transmissions that are scheduled in the slot after the one or more CSI reports are determined.

21. A network entity for wireless communication, comprising:
a memory; and
one or more processors coupled to the memory, the one or more processors configured to:
identify multiple channel state information (CSI) reports that a user equipment (UE) is scheduled to transmit in a slot on respective physical uplink control channel (PUCCH) resources, wherein the multiple CSI reports include one or more CSI reports associated with a first service type and one or more CSI reports associated with a second service type;
determine, from the multiple CSI reports, one or more CSI reports to be transmitted in the slot based at least in part on whether the UE is configured with a radio resource control (RRC) parameter that specifies resources for multiplexing the CSI reports, a first priority associated with the first service type, and a second priority associated with the second service type,
wherein the one or more CSI reports associated with the first service type do not overlap in time with the one or more CSI reports associated with the second service type in the slot, and
wherein the one or more processors, when determining the one or more CSI reports to be transmitted in the slot, are further configured to:
determine that the UE is to drop the one or more CSI reports associated with the first service type based at least in part on the one or more CSI reports associated with the second service type being scheduled for transmission in the slot, regardless of whether the one or more CSI reports associated with the first service type overlap in time with the one or more CSI reports associated with the second service type in the slot, and based at least in part on the first priority associated with the first service type being lower than the second priority associated with the second service type; and
determine the one or more CSI reports to be transmitted in the slot from the one or more CSI reports associated with the second service type, based on one or more levels of a priority hierarchy associated with the respective PUCCH resources,
the one or more levels of the priority hierarchy corresponding to an evaluation of at least one of a cell identifier, a CSI report configuration identifier, or CSI report type; and
receive, in the slot, one or more PUCCH transmissions that include the one or more CSI reports.

22. The network entity of claim 21, wherein the multiple CSI reports scheduled to be transmitted in the slot include at least two CSI reports that are associated with PUCCH resources that overlap in time.

23. The network entity of claim 21, wherein the one or more CSI reports that are transmitted in the slot include two CSI reports, of the multiple CSI reports, that have a highest priority, based at least in part on determining that none of the multiple CSI reports are associated with PUCCH resources that overlap in time.

24. The network entity of claim 21, wherein the one or more CSI reports to be transmitted in the slot include multiple CSI reports; and
wherein the one or more processors are further configured to:
multiplex at least two of the multiple CSI reports, using the resources for multiplexing the CSI reports, based at least in part on the RRC parameter and payload sizes of the multiple CSI reports.

\* \* \* \* \*